May 7, 1974   E. J. ARONOFF ET AL   3,809,569
METHOD OF PAINTING POLYOLEFIN SUBSTRATE
Original Filed Aug. 4, 1969
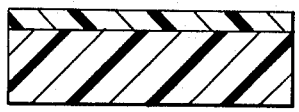
ELECTRON POLYMERIZED
— DI-OR TRIACRYLATE-VINYL RESIN PAINT
— ACRYLONITRILE-BUTADIENE-STYRENE
COPOLYMER
ELIHU J. ARONOFF
ERNEST O. McLAUGHLIN
INVENTORS
BY John R. Faulkner
Olin B. Johnson
ATTORNEYS

United States Patent Office

3,809,569
Patented May 7, 1974

3,809,569
METHOD OF PAINTING POLYOLEFIN SUBSTRATE
Elihu J. Aronoff, 52 Lanewood Ave., Framingham, Mass. 01701, and Ernest O. McLaughlin, 165 Arcola, Garden City, Mich. 48135
Continuation of abandoned application Ser. No. 847,230, Aug. 4, 1969. This application Oct. 4, 1971, Ser. No. 186,545
Int. Cl. B44d *1/50;* C08f *3/64*
U.S. Cl. 117—93.31                  6 Claims

ABSTRACT OF THE DISCLOSURE

An improved method for coating a solid substrate of polyolefin with an adherent coating of a copolymer of acrylic monomers crosslinked wtih vinyl monomers which comprises applying to the polyolefin substrate a film-forming solution which, on a pigment and particulate filler-free basis consists essentially of (A) about 15 to about 45 weight percent acrylate selected from the group consisting of diacrylates and dimethacrylates of a $C_2$–$C_{12}$ alkane diol, diacrylates and dimethacrylates of a $C_4$–$C_{12}$ polyether diol, and triacrylates and trimethacrylates of a $C_6$–$C_{12}$ triol, and (B) 55 to 85 weight percent of a vinyl resin-comprising component consisting of 0 to about 85 weight percent monovinyl monomers and about 15 to 100 weight percent of an alpha-beta olefinically unsaturated copolymer of acrylic monomers containing between about 0.5 and about 5 units of alpha-beta olefinic unsaturation per 1,000 units molecular weight and crosslinking the liquid coating on the polyolefin substrate by exposing the coating to a beam of polymerization effecting electrons having average energy in the range of about 100,000 to about 500,000 electron volts.

---

This application is a continuation of Ser. No. 847,230, filed Aug. 4, 1969, and now abandoned.

This invention relates to polyolefin substrates bearing a tenaciously adhering vinyl paint film. The term "polyolefin" as used herein refers to polyethylene, polypropylene and ethylene-propylene copolymers.

Previous attempts to effectively paint polyolefin substrates with a vinyl resin comprising paint without pretreatment of the polyolefin substrates have been characterized by extremely poor adhesion between paint film and substrate. Even vinyl resin-vinyl monomer paints which have exhibited excellent adhesion when polymerized on other substrates with ionizing radiation fail to adhere effectively to a polyolefin substrate.

Surprisingly, it has been found that the adhesion of a vinyl resin or vinyl resin-monovinyl monomer paint binder to a polyolefin substrate is unexpectedly and dramatically improved if the paint binder contains at least about 15 weight percent of certain acrylates, hereinafter defined, and the film is polymerized upon the polyolefin surface with a beam of electrons having average energy in the range of about 100,000 to about 500,000, preferably about 150,000 to about 450,000 electron volts.

The term "acrylate" as used herein includes esters of an alcohol and either acrylic acid or methacrylic acid, i.e. acrylates and methacrylates.

The critical elements in this invention are the use of sufficient quantities of the selected acrylates, their use with a vinyl unsaturated paint binder resin and the crosslinking of the same with the electron beam on the surface of the polyolefin.

The drawing shows an electron polymerized di- or tri-acrylate-vinyl resin paint on the surface of acrylonitrile-butadiene-styrene copolymer.

The acrylates used in this invention may be divided into three groups. In the first embodiment, the acrylate is a diacrylate, dimethacrylate, or monoacrylate-monomethacrylate of a $C_2$–$C_{12}$ alkane diol, i.e. the diester of one molar amount of a $C_2$–$C_{12}$ alkane diol and two molar amounts of acrylic acid or methacrylic acid or one molar amount of each. Such diols include ethane diol (ethylene glycol) propane diol, butane diol, hexane diol, octane diol, decane diol, and dodecane diol. These diols may be either straight or branched chain diols. In the second embodiment, the acrylate is a diacrylate, dimethacrylate or monoacrylate-monomethacrylate of a $C_4$–$C_{12}$ polyether diol. Such diols include diethylene diols (glycol), dipropylene diol, triethylene diol, tetraethylene diol, and tetrapropylene diol. In the third embodiment, the acrylate is a triacrylate, trimethacrylate, monoacrylate-dimethacrylate, diacrylate-monomethacrylate of a $C_6$–$C_{12}$ triol, e.g. trimethylolpropane triacrylate, trimethylolpropane trimethacrylate, 1,4,10 - decane triol triacrylate, 1,4,10-decane triol trimethacrylate, 1,5,12-dodecane triol triacrylate, 1,5,12-dodecane triol trimethacrylate, etc. On a pigment, mineral filler and nonpolymerizable solvent-free basis, the paint binder solution contains about 15 to about 45, preferably about 20 to about 35, weight percent of one of the aforementioned acrylates or mixtures thereof.

The balance of the paint binder solution, i.e. 55 to 85 weight percent of the total, is made up of a vinyl unsaturated paint binder resin and optionally monovinyl monomers. The vinyl resin used in this paint is a vinyl monomer-comprising copolymer and comprises about 15 to about 100 weight percent of the balance. The monovinyl monomers comprise 0 to 85, advantageously 5 to 85, and preferably 65 to 85, weight percent of the balance. Advantageously such resins have average molecular weights in the range of about 1,000 to about 25,000, preferably 5,000 to 15,000.

The vinyl resin used has above about 0.5 and below about 5 units of alpha-beta olefinic unsaturation per 1,000 units molecular weight, preferably about 0.7 to about 3 of such units per 1,000 units molecular weight. A preferred vinyl resin is prepared by copolymerizing acrylates such as methyl methacrylate, ethyl acrylate, butyl acrylate, 2-ethyl hexyl acrylate, etc. and an amount of glycidyl methacrylate commensurate with the amount of unsaturation desired. This is introduced in a second step reaction by reacting this copolymer with acrylic or methacrylic acid. Other vinyl resins are illustrated in the examples that follow.

The monovinyl monomer component when used may be styrene, methyl methacrylate, ethyl acrylate, hydroxyethyl methacrylate, butyl acrylate, butyl methacrylate, 2-ethylhexyl methacrylate, mixtures of the same, etc.

In this specification the term "paint" is meant to include pigment and/or particulate filler, the binder without pigment and/or filler or having very little of the same, which can be tinted if desired. Thus, the binder which is ultimately converted to a durable film resistant to weathering, can be all or virtually all that is used to form the film, or it can be a vehicle for pigment and/or particulate filler material. It may contain a volatile non-polymerizable solvent which may be flashed off prior to curing.

This invention will be more fully understood from the following illustrative examples:

EXAMPLE 1

An alpha-beta olefinically unsaturated vinyl resin, resin A, is prepared in the following manner.

| Starting materials: | Parts by weight |
|---|---|
| Xylene | 600 |
| Methyl methacrylate | 196 |
| Ethyl acrylate | 333 |
| Glycidyl methacrylate | 71 |
| Azobisiso butyronitrile | 6 |
| Hydroquinone | 0.12 |
| Methacrylic acid | 42 |
| Triethyl amine | 0.96 |

Procedure

The solvent, xylene, is charged to a flask fitted with a stirring rod, an addition funnel, a thermometer, a nitrogen inlet tube and a condenser. The amount of xylene is equal to the total weight of vinyl monomers to be added. The xylene is heated to reflux, nitrogen is bubbled through the solution during heat up and throughout the reaction. The combined monomers, excepting the methacrylic acid, and initiator (azobisiso butyronitrile) are added to the refluxing solution evenly over a two-hour period. The initiator weight is 10 parts by weight per 1,000 parts by weight vinyl monomers. The reaction solution is refluxed until the conversion of monomer to polymer is greater than about 97 percent.

In the second step, hydroquinone is added as an inhibitor and then the methacrylic acid is added to react with the epoxy groups on the polymer. Triethyl amine is used as a catalyst. This esterification reaction is carried out at reflux temperatures until about 80 percent esterification is accomplished (determined by residual acid number). The xylene is then removed by vacuum distillation and the polymer is recovered.

Control test #1

A paint binder solution is formed from 25 parts by weight resin A and 75 parts by weight methyl methacrylate. This solution is applied to the surface of different polyolefin substrates to an average depth of about 1 mil (.001 inch) and irradiated in a nitrogen atmosphere with a beam of electrons having an average energy of 275,000 electron volts and a current of 25 milliamperes until the coating is exposed to a total dose of about 12 mrad. The coatings are subjected to a standard adhesion test, hereinafter identified and described in detail, and the results are set forth below.

TABLE I

Adhesion test.—Paint formulation I (resin A 25%-methyl methacrylate 75%)

| Substrate: | Adhesion, percent |
|---|---|
| Polypropylene | 0 |
| Propylene-ethylene copolymer | 0 |
| High density polyethylene | 0 |

Control test #2

A second test is prepared using the same procedure except that in the paint binder solution the resin component is increased to 50 parts by weight and that of the monovinyl monomer reduced to 50 parts by weight. The adhesion test is carried out upon the cured coatings as before, and the results are set forth below.

TABLE II

Adhesion test.—Paint formulation II (resin A 50%-methyl methacrylate 50%)

| Substrate: | Adhesion, percent |
|---|---|
| Polypropylene | 0 |
| Propylene-ethylene copolymer | 0 |
| High density polyethylene | 0 |

Control test #3

A third test is prepared using the same procedure except that in the paint binder solution the vinyl monomer component is changed to butyl acrylate. The adhesion test is carried out upon the cured coatings as in the preceding tests and the results are set forth below.

TABLE III

Adhesion test.—Paint formulation III (resin A 50%-butyl acrylate 50%)

| Substrate: | Adhesion, percent |
|---|---|
| Polypropylene | 0 |
| Propylene-ethylene copolymer | 0 |
| High density polypropylene | 0 |

Control test #4

A fourth test is prepared using the same procedure except that in the paint binder solution the vinyl monomer component is changed to 2-ethylhexyl acrylate. The adhesion test is carried out upon the cured coatings as in the preceding tests and the results are set forth below.

TABLE IV

Adhesion test.—Paint formulation IV (resin A 50%-2-ethylhexyl acrylate 50%)

| Substrate: | Adhesion, percent |
|---|---|
| Polypropylene | 0 |
| Propylene-ethylene copolymer | 0 |
| High density polypropylene | 0 |

Control test #5

A fifth test is prepared using the same procedure except that in the paint binder solution the resin component is increased to 75 parts by weight and that of the monovinyl monomer reduced to 25 parts by weight. The adhesion test is carried out upon the cured coatings as in the preceding tests and the results are set forth below.

TABLE V

Adhesion test.—Paint formulation V (resin A 75%-methyl methacrylate 25%)

| Substrate: | Adhesion, percent |
|---|---|
| Polypropylene | 0 |
| Propylene-ethylene copolymer | 0 |
| High density polypropylene | 0 |

Control test #6

A sixth test is prepared using the same procedure except that in the paint binder solution the resin component is decreased to 15 parts by weight and that of the monovinyl monomer increased to 85 parts by weight. The adhesion test is carried out upon the cured coatings as in the preceding tests and the results are set forth below.

TABLE VI

Adhesion test.—Paint formulation VI (resin A 15%-methyl methacrylate 85%)

| Substrate: | Adhesion, percent |
|---|---|
| Polypropylene | 0 |
| Propylene-ethylene copolymer | 0 |
| Polyethylene | 0 |

The adhesion failures of vinyl resin-monovinyl monomer paints being thus demonstrated at various resin concentrations and with different monomers, the first test in accordance with this invention is prepared using the same procedure except that the paint binder solution contains 25 parts by weight of resin A, 45 parts by weight of methyl methacrylate and 30 parts by weight of ethane diol (ethylene glycol) dimethacrylate. The adhesion test is carried out upon the cured coatings as in the preceding tests and the results are set forth below.

TABLE VII

Adhesion test.—Paint formulation VII (resin A 25%-methyl methacrylate 45%-ethane diol dimethacrylate 30%)

| Substrate: | Adhesion, percent |
|---|---|
| Polypropylene | 100 |
| Propylene-ethylene copolymer | 100 |
| High density polyethylene | 100 |

EXAMPLE 2

In order to test for required quantities of the diacrylates and triacrylates used herein and to test the suitability of various diacrylates and triacrylates of the types hereinbefore named, additional tests are carried out.

An eighth test is carried out using the same procedure used in the preceding tests except that the paint binder solution contains 25 parts by weight of resin A, 70 parts by weight of methyl methacrylate and 5 parts by weight of ethane diol dimethacrylate. The adhesion test is carried out upon the cured coatings as in the preceding tests and the results are set forth below.

TABLE VIII

Adhesion test.—Paint formulation VII (resin A 25%-methly methacrylate 70%-ethane diol dimethacrylate 5%)

| Substrate: | Adhesion, percent |
|---|---|
| Polypropylene | 10 |
| Propylene-ethylene copolymer | 5 |
| High density polyethylene | 0 |

A ninth test is carried out using the same procedure used in the precedinf tests except that the paint binder solution contains 25 parts by weight of resin A, 70 parts by weight of methyl methacrylate and 5 parts by weight of 1,4-butanediol dimethacrylate. The adhesion test is carried out upon the cured coatings as in the preceding tests and the results are set forth below.

TABLE IX

Adhesion test.—Paint formulation IX (resin A 25%-methyl methacrylate 70%-1,4-butane diol dimethacrylate 5%)

| Substrate: | Adhesion, percent |
|---|---|
| Polypropylene | 15 |
| Propylene-ethylene copolymer | 15 |
| High density polyethylene | 5 |

A tenth test is carried out using the same procedure used in the preceding tests except that the paint binder solution contains 15 parts by weight of resin A, 80 parts by weight of methyl methacrylate, and 5 parts by weight of ethane diol dimethacrylate. The adhesion test is carried out upon the cured coatings as in the preceding tests and the results are set forth below.

TABLE X

Adhesion test.—Paint formulation X (resin A 15%-methyl methacrylate 80%-ethane diol dimethacrylate 5%)

| Substrate: | Adhesion, percent |
|---|---|
| Polypropylene | 15 |
| Propylene-ethylene copolymer | 10 |
| High density polyethylene | 5 |

An eleventh test is carried out using the same procedure used in the preceding tests except that the paint binder solution contains 25 parts by weight of resin A, 65 parts by weight of methyl methacrylate and 10 parts by weight of ethane diol dimethacrylate. The adhesion test is carried out upon the cured coatings as in the preceding tests and the results are set forth as follows.

TABLE XI

Adhesion test.—Paint formulation XI (resin A 25%-methyl methacrylate 65%-ethane diol dimethacrylate 10%)

| Substrate: | Adhesion, percent |
|---|---|
| Polypropylene | 30 |
| Propylene-ethylene copolymer | 30 |
| High density polyethylene | 15 |

A twelfth test is carried out using the same procedure used in the preceding tests except that the paint binder solution contains 25 parts by weight of resin A, 60 parts by weight of methyl methacrylate, and 15 parts by weight of 1,4-butanediol dimethacrylate. The adhesion test is carried out upon the cured coatings as in the preceding tests and the results are set forth below.

TABLE XII

Adhesion test.—Paint formulation XII (resin A 25%-methyl methacrylate 60%-1,4-butane diol dimethacrylate 15%)

| Substrate: | Adhesion, percent |
|---|---|
| Polypropylene | 60 |
| Propylene-ethylene copolymer | 50 |
| High density polyethylene | 40 |

A thirteenth test is carried out using the same procedure used in the preceding tests except that the paint binder solution contains 50 parts by weight of resin A, 35 parts by weight of methyl methacrylate and 15 parts by weight of 1,4-butane diol dimethacrylate. The adhesion test is carried out upon the cured coatings as in the preceding tests and the results are set forth below.

TABLE XIII

Adhesion test.—Paint formulation XIII (resin A 50%-methyl methacrylate 35%-1,4-butane diol dimethacrylate 15%)

| Substrate: | Adhesion, percent |
|---|---|
| Polypropylene | 50 |
| Propylene-ethylene copolymer | 45 |
| High density polyethylene | 30 |

A fourteenth test is carried out using the same procedure used in the preceding tests except that the paint binder solution contains 50 parts by weight of resin A, 35 parts by weight of butyl acrylate, and 15 parts by weight of 1,4-butane diol dimethacrylate. The adhesion test is carried out upon the cured coatings as in the preceding tests and the results are set forth below.

TABLE XIV

Adhesion test.—Paint formulation XIV (resin A 50%-butyl acrylate 35%-1,4-butane diol dimethacrylate 15%)

| Substrate: | Adhesion, percent |
|---|---|
| Polypropylene | 60 |
| Propylene-ethylene copolymer | 45 |
| High density polyethylene | 30 |

A fifteenth test is carried out using the same procedure used in the preceding tests except that the paint binder solution contains 50 parts by weight of resin A, 35 parts by weight of 2-ethylhexyl acrylate, and 15 parts by weight of 1,4-butane diol dimethacrylate. The adhesion test is carried out upon the cured coatings as in the preceding tests and the results are set forth below.

TABLE XV

Adhesion test.—Paint formulation XV (resin A 50%-2-ethylhexyl acrylate 35%-1,4-butane diol dimethacrylate 15%)

| Substrate: | Adhesion, percent |
|---|---|
| Polypropylene | 65 |
| Propylene-ethylene copolymer | 55 |
| High density polyethylene | 35 |

A sixteenth test is carried out using the same procedure used in the preceding tests except that the paint binder solution contains 15 parts by weight of resin A, 35 parts by weight of methyl methacrylate, 35 parts by weight of 2-ethylhexyl acrylate, and 15 parts by weight of ethane diol dimethacrylate. The adhesion test is carried out upon the cured coatings as in the preceding tests and the results are set forth below.

TABLE XVI

Adhesion test.—Paint formulation XVI (resin A 15%-methyl methacrylate 35%-2-ethylhexyl acrylate 35%-1,4-butane diol dimethacrylate 15%

| Substrate: | Adhesion, percent |
|---|---|
| Polypropylene | 95 |
| Propylene-ethylene copolymer | 95 |
| High density polyethylene | 90 |

A seventeenth test is carried out using the same procedure used in the preceding tests except that the paint binder solution contains 50 parts by weight of resin A, 35 parts by weight of methyl methacrylate, and 15 parts by weight of 1,6-hexanediol dimethacrylate. The adhesion test is carried out upon the cured coatings as in the preceding tests and the results are set forth below.

TABLE XVII

Adhesion test.—Paint formulation XVII (resin A 50%-methyl methacrylate 35%-1,6-hexane diol dimethacrylate 15%)

| Substrate: | Adhesion, percent |
|---|---|
| Polypropylene | 65 |
| Propylene-ethylene copolymer | 65 |
| High density polyethylene | 60 |

An eighteenth test is carried out using the same procedure used in the preceding tests except that the paint binder solution contains 25 parts by weight of resin A, 55 parts by weight of methyl methacrylate, and 20 parts by weight of ethane diol dimethacrylate. The adhesion test is carried out upon the cured coatings as in the preceding tests and the results are set forth below.

TABLE XVIII

Adhesion test.—Paint formulation XVIII (resin A 25%-methyl methacrylate 55%-ethane diol dimethacrylate 20%)

| Substrate: | Adhesion, percent |
|---|---|
| Polypropylene | 100 |
| Propylene-ethylene copolymer | 100 |
| High density polyethylene | 85 |

A nineteenth test is carried out using the same procedure used in the preceding tests except that the paint binder solution contains 50 parts by weight of resin A, 30 parts by weight of methyl methacrylate, and 20 parts by weight of 1,4-butane diol dimethacrylate. The adhesion test is carried out upon the cured coatings as in the preceding tests and the results are set forth below.

TABLE XIX

Adhesion test.—Paint formulation XIX (resin A 50%-methyl methacrylate 30%-1,4-butane diol dimethacrylate 20%)

| Substrate: | Adhesion, percent |
|---|---|
| Polypropylene | 90 |
| Propylene-ethylene copolymer | 90 |
| High density polyethylene | 80 |

A twentieth test is carried out using the same procedure used in the preceding tests except that the paint binder solution contains 25 parts by weight of resin A, 55 parts by weight of methyl methacrylate, and 20 parts by weight of 1,6-hexane diol diacrylate. The adhesion test is carried out upon the cured coatings as in the preceding tests and the results are set forth below.

TABLE XX

Adhesion test.—Paint formulation XX (resin A 25%-methyl methacrylate 55%-1,6 hexane diol dimethacrylate 20%)

| Substrate: | Adhesion, percent |
|---|---|
| Polypropylene | 100 |
| Propylene-ethylene copolymer | 100 |
| High density polyethylene | 85 |

A twenty-first test is carried out using the same procedure used in the preceding tests except that the paint binder solution contains 50 parts by weight of resin A, 30 parts by weight of methyl methacrylate, and 20 parts by weight of ethane diol dimethacrylate. The adhesion test is carried out upon the cured coatings as in the preceding tests and the results are set forth below.

TABLE XXI

Adhesion test.—Paint formulation XXI (resin A 50%-methyl methacrylate 30%-ethane diol dimethacrylate 20%)

| Substrate: | Adhesion, percent |
|---|---|
| Polypropylene | 80 |
| Propylene-ethylene copolymer | 75 |
| High density polyethylene | 60 |

A twenty-second test is carried out using the same procedure used in the preceding tests except that the paint binder soluion contains 50 parts by weight of resin A, 30 parts by weight of methyl methacrylate, and 20 parts by weight of tetraethylene glycol dimethacrylate. The adhesion test is carried out upon the cured coatings as in the preceding tests and the results are set forth below.

TABLE XXII

Adhesion test.—Paint formulation XXII (resin A 50%-methyl methacrylate 30%-tetraethylene glycol dimethacrylate 20%)

| Substrate: | Adhesion, percent |
|---|---|
| Polypropylene | 90 |
| Propylene-ethylene copolymer | 90 |
| High density polyethylene | 80 |

A twenty-third test is carried out using the same procedure used in the preceding tests except that the paint binder solution contains 75 parts by weight resin A, 5 parts by weight of methyl methacrylate, and 20 parts by weight of ethane diol dimethacrylate. The adhesion test is carried out upon the cured coatings as in the preceding tests and the results are set forth below.

TABLE XXIII

Adhesion test.—Paint formulation XXIII (resin A 75%-methyl methacrylate 5%-ethane diol dimethacrylate 20%)

| Substrate: | Adhesion, percent |
|---|---|
| Polypropylene | 80 |
| Propylene-ethylene copolymer | 70 |
| High density polyethylene | 65 |

A twenty-fourth test is carried out using the same procedure used in the preceding tests except that the paint binder solution contains 25 parts by weight of resin A, 45 parts by weight of methyl methacrylate, and 30 parts by weight of 1,6-hexane diol dimethacrylate. The adhesion test is carried out upon the cured coatings as in the preceding tests and the results are set forth as follows.

TABLE XXIV

Adhesion test.—Paint formulation XXIV (resin A 25%-methyl methacrylate 45%-1,6-hexane diol dimethacrylate 30%)

| Substrate: | Adhesion, percent |
|---|---|
| Polypropylene | 100 |
| Propylene-ethylene copolymer | 100 |
| High density polyethylene | 100 |

A twenty-fifth test is carried out using the same procedure used in the preceding tests except that the paint binder solution contains 25 parts by weight of resin A, 45 parts by weight of methyl methacrylate, and 30 parts by weight of diethylene glycol dimethacrylate. The adhesion test is carried out upon the cured coatings as in the preceding tests and the results are set forth below.

TABLE XXV

Adhesion test.—Paint formulation XXV (resin A 25%-methyl methacrylate 45%- diethylene glycol dimethacrylate 30%)

| Substrate: | Adhesion, percent |
|---|---|
| Polypropylene | 100 |
| Propylene-ethylene copolymer | 100 |
| High density polyethylene | 100 |

A twenty-sixth test is carried out using the same procedure used in the preceding tests except that the paint binder solution contains 25 parts by weight of resin A, 45 parts by weight of methyl methacrylate, and 30 parts by weight of tetrapropylene glycol dimethacrylate. The adhesion test is carried out upon the cured ctatings as in the preceding tests and the results are set forth below.

TABLE XXVI

Adhesion Test.—Paint formulation XXVI (resin A 25%-methyl methacrylate 45%- tetrapropylene glycol dimethacrylate 30%)

| Substrate: | Adhesion, percent |
|---|---|
| Polypropylene | 100 |
| Propylene-ethylene copolymer | 100 |
| High density polyethylene | 100 |

A twenty-seventh test is carried out using the same procedure used in the preceding tests except that the paint binder solution contains 25 parts by weight of resin A, 45 parts by weight of methyl methacrylate, and 30 parts by weight of trimethylolpropane triacrylate. The adhesion test is carried out upon the cured coatings as in the preceding tests and the results are set forth below.

TABLE XXVII

Adhesion test.—Paint formulation XXVII (resin A 25%-methyl methacrylate 45%- trimethylolpropane triacrylate 30%)

| Substrate: | Adhesion, percent |
|---|---|
| Polypropylene | 100 |
| Propylene-ethylene copolymer | 100 |
| High density polyethylene | 100 |

A twenty-eighth test is carried out using the same procedure used in the preceding tests except that the paint binder solution contains 25 parts by weight of resin A, 45 parts by weight of methyl methacrylate, and 30 parts by weight of 1,5,12-dodecane triol trimethacrylate. The adhesion test is carried out upon the cured coatings as in the preceding tests and the results are set forth below.

TABLE XXVIII

Adhesion test.—Paint formulation XXVIII (resin A 25%-methyl methacrylate 45%- 1,5,12-dodecane triol trimethacrylate 30%)

| Substrate: | Adhesion, percent |
|---|---|
| Polypropylene | 100 |
| Propylene-ethylene copolymer | 100 |
| High density polyethylene | 100 |

A twenty-ninth test is carried out using the same procedure used in the preceding tests except that the paint binder solution contains 25 parts by weight of resin A, 30 parts by weight of methyl methacrylate, and 45 parts by weight of ethane diol dimethacrylate. The adhesion test is carried out upon the cured coatings as in the preceding tests and the results are set forth below.

TABLE XXIX

Adhesion test.—Paint formulation XXIX (resin A 25%-methyl methacrylate 30%-ethane diol dimethacrylate 45%)

| Substrate: | Adhesion, percent |
|---|---|
| Polypropylene | 100 |
| Propylene-ethylene copolymer | 100 |
| High density polyethylene | 100 |

EXAMPLE 3

A thirtieth test is carried out using the same procedure used in the preceding tests except that the paint binder solution contains 60 parts by weight of resin A and 40 parts by weight of ethane diol dimethacrylate. Adhesion is obtained commensurate with the tests in Example 2 wherein the paint binder solution contains at least 20 weight percent of the diacrylate.

EXAMPLE 4

The procedure of Example 1 is repeated with the single difference that the electrons of the beam have an average energy of electron 350,000 volts.

EXAMPLE 5

The procedure The procedure of Example 1 is repeated with the single difference that the atmosphere of irradiation is helium.

EXAMPLE 6

The procedures of Examples 1 and 2 are repeated with the single difference that resin A is replaced with resin B. Resin B is prepared from the following ingredients in the following manner.

| Step I: | Parts by weight |
|---|---|
| Ethyl acrylate | 38.8 |
| Methyl methacrylate | 23.2 |
| Allyl glycidyl ether | 37.0 |
| Benzoyl peroxide | 1.0 |
| Xylene | Solvent |

To a reaction vessel provided with a condenser, thermometer, agitator, and dropping funnel there is charged an amount of xylene equal in weight to the reactants to be added in the first reaction step. The xylene is heated to about 100°–120° C. The four reactants are thoroughly mixed and added slowly with a dropping funnel to the heated xylene over a period of four hours. The reaction is held at this temperature for 1–2 hours after addition is complete and then allowed to cool to room temperature.

The copolymer formed by this procedure is further reacted in the following manner.

| Step II: | Parts by weight |
|---|---|
| Copolymer from step I | 69.4 |
| Allyl alcohol | 30.4 |
| Potassium hydroxide | 0.2 |

A solution of the allyl alcohol and potassium hydroxide is added to the copolymer at room temperature. The mixture is then heated to a temperature of 100°–120° C. This temperature is maintained for about 7 hours and allowed to cool. The binder polymer reaction mixture is heated to about 60° C. and the xylene and excess reactant are removed by vacuum distillation.

EXAMPLE 7

The procedures of Examples 1 and 2 are repeated with the single difference that resin A is replaced with resin C. Resin C is prepared from the following ingredients in the following manner.

| Step I: | Parts by weight |
| --- | --- |
| Ethyl acrylate | 39 |
| Methyl methacrylate | 24 |
| Allyl alcohol | 36 |
| Benzoyl peroxide | 1 |
| Xylene | Solvent |

To a reaction vessel provided with a condenser, thermometer, agitator, and dropping funnel there is charged an amount of xylene equal in weight to the reactants to be added in the first reaction step. The xylene is heated to about 100°–120° C. The four reacting materials are thoroughly mixed and added slowly with a dropping funnel to the heated xylene over a period of four hours. The reaction is held at this temperature 1–2 hours after addition is complete and then allowed to cool to room temperature.

The copolymer formed by this procedure is further reacted in the following manner.

| Step II: | Parts by weight |
| --- | --- |
| Copolymer from step I | 69 |
| Allyl glycidyl ether | 30.8 |
| Potassium hydroxide | 0.2 |

A solution of the allyl glycidyl ether and potassium hydroxide is added to the copolymer at room temperature. The mixture is then heated to a temperature of 100°–120° C. This temperature is maintained for about seven hours and allowed to cool. The binder polymer reaction mixture is heated to about 60° C. and the xylene and excess reactant are removed by vacuum distillation.

EXAMPLE 8

The procedures of Examples 1 and 2 are repeated with the single difference that resin A is replaced with resin D. Resin D is prepared from the following ingredients in the following manner.

| Step I: | Parts by weight |
| --- | --- |
| Methyl methacrylate | 400 |
| Ethyl acrylate | 400 |
| Hydroxy ethyl methacrylate | 195 |
| Toluene | 1000 |
| Benzoyl peroxide | 30 |

The benzoyl peroxide is dissolved in a solution of the methyl methacrylate, ethyl acrylate, and hydroxyethyl methacrylate and one-half of the toluene. This solution is added incrementally to the remainder of the toluene at reflux over a seven-hour period with a final pot temperature of about 138°–140° C. Reflux is maintained for another three hours and the solution cooled.

| Step II: | Parts by weight |
| --- | --- |
| Solution from step I | 500 |
| Acrylyl chloride | 33.8 |
| Toluene | 30 |

The solution from step I is heated to 60° C. and a solution of the acrylyl chloride and toluene are added dropwise over a four-hour period while the temperature is allowed to rise to about 90° C. This solution is subjected to vacuum below 10 mm. Hg at 70° C. and the acrylic polymer is recovered.

Adhesion is tested in all examples in the following manner: crosshatch—parallel lines 1/16 inch apart are inscribed on the coating cutting through to the substrate. Additional parallel lines 1/16 inch apart are inscribed in like manner at right angles to the first group and crossing same. Adhesive cellophane tape is then applied over the scored surface and removed. Adhesion is measured from the number of paint squares remaining in the taped area relative to paint squares removed. Tape having the same adhesive quality is used in all tests. It is applied to the coated surface and removed therefrom in the same manner for all tests.

The abbreviation "rad" as employed herein means that dose of radiation which results in the absorption of 100 ergs of energy per gram of absorber, e.g. coating film. The abbreviation "mrad" as employed herein means 1 million rad. The electron emitting means may be a linear electron accelerator capable of producing a direct current potential in the range of about 100,000 to about 500,000 volts. In such a device electrons are ordinarily emitted from a hot filament and accelerated through a uniform voltage gradient. The electron beam, which may be about 1/8 inch in diameter at this point, may then be scanned to make a fan-shaped beam and then passed through a metal window, e.g. a magnesium thorium alloy, aluminum, an alloy of aluminum and a minor amount of copper, etc., of about 0.003 inch thickness. The irradiation is preferably carried out in a substantially oxygen-free atmosphere, e.g. nitrogen, helium, etc.

It will be understood by those skilled in the art that modifications can be made within the foregoing examples without departing from the spirit and scope of the invention as set forth in the following claims.

What is claimed is:

1. In a method for coating a solid substrate of polyolefin with a vinyl copolymer crosslinked with vinyl monomers, the improvement which comprises applying to the polyolefin substrate a coating of a film-forming solution which on a pigment and particulate filler-free basis, consists essentially of (A) about 15 to about 45 weight percent acrylate selected from the group consisting of diacrylates and dimethacrylates of a $C_2$–$C_{12}$ alkane diol, diacrylates and dimethacrylates of a $C_4$–$C_{12}$ polyether diol, and triacrylates of a $C_6$–$C_{12}$ triol, and (B) 55 to 85 weight percent of a vinyl resin-comprising component consisting of 0 to about 85 weight percent monovinyl monomers and about 15 to about 100 weight percent of an alpha-beta olefinically unsaturated copolymer of acrylic monomers having average molecular weight between 1,000 and 25,000 and 0.5 to 5 units of alpha-beta olefinic unsaturation per 1,000 units molecular weight and crosslinking said coating on said polyolefin substrate by exposing said coating to a beam of polymerization effecting electrons having average energy in the range of about 100,000 to about 500,000 electron volts in a substantially oxygen-free atmosphere.

2. A method in accordance with claim 1 wherein said acrylate of (A) comprises between 20 and 35 percent of said film-forming solution.

3. A method in accordance with claim 1 wherein said copolymer of acrylic monomers has average molecular weight in the range of about 5,000 to about 15,000 and about 0.7 to about 3 units of alpha-beta olefinic unsaturation per 1,000 units molecular weight.

4. A method in accordance with claim 1 wherein said copolymer of acrylic monomers has average molecular weight in the range of about 5,000 to about 15,000 and about 0.7 to about 3 units of alpha-beta olefinic unsaturation per 1,000 units molecular weight and is a copolymer of a glycidyl acrylate selected from glycidyl acrylate and glycidyl methacrylate, and a monoester acrylate selected from esters of acrylic or methacrylic acid and a $C_1$ to $C_8$ monohydric alcohol, said copolymer having been reacted with acrylic or methacrylic acid to introduce said units of alpha-beta olefinic ulnsaturation.

5. A method in accordance with claim 1 wherein said substantially oxygen-free atmosphere is essentially a nitrogen atmosphere.

6. A method in accordance with claim 1 wherein said electrons have average energy in the range of about 150,000 to about 450,000 electron volts.

References Cited
UNITED STATES PATENTS

| | | | |
|---|---|---|---|
| 3,552,986 | 1/1971 | Bassemir et al. | 117—161 UC |
| 3,265,764 | 8/1966 | Deichert et al. | 117—138.8 E |
| 3,318,975 | 5/1967 | Deichert et al. | 117—138.8 E |
| 3,528,844 | 9/1970 | Burlant et al. | 117—93.31 |
| 3,560,245 | 2/1971 | Aronoff et al. | 117—93.31 |

WILLIAM D. MARTIN, Primary Examiner

J. H. NEWSOME, Assistant Examiner

U.S. Cl. X.R.

117—138.8 E, 161 UC; 204—159.16; 260—875